US012683425B2

(12) United States Patent
Kalvakunta et al.

(10) Patent No.: US 12,683,425 B2
(45) Date of Patent: Jul. 14, 2026

(54) TECHNIQUES FOR MANAGING CHARGING OF BATTERIES

(71) Applicant: SCHNEIDER ELECTRIC IT CORPORATION, Foxboro, MA (US)

(72) Inventors: Murali Krishna Kalvakunta, Bangalore (IN); Sumandra Ghosh Chowdhury, Bangalore (IN); Pradeep Tolakanahalli Nagabhushanrao, Bangalore (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 110 days.

(21) Appl. No.: 18/816,666

(22) Filed: Aug. 27, 2024

(65) Prior Publication Data

US 2026/0066688 A1 Mar. 5, 2026

(51) Int. Cl.
*G06F 1/00* (2006.01)
*G06F 11/30* (2006.01)
(Continued)

(52) U.S. Cl.
CPC ............. *H02J 9/06* (2013.01); *H01M 10/443* (2013.01); *H01M 10/613* (2015.04);
(Continued)

(58) Field of Classification Search
CPC ...... H02J 9/06; H02J 7/40; H02J 7/933; H02J 7/977; H02J 13/13; H01M 10/443; H01M 10/613; H01M 10/615; H01M 10/633
See application file for complete search history.

(56) References Cited

U.S. PATENT DOCUMENTS 9,634,512 B1 * 4/2017 Kim .................. H02J 7/663
9,843,222 B2 * 12/2017 Yeon .................. H02J 9/062
(Continued)

FOREIGN PATENT DOCUMENTS

JP 2013134550 A 7/2013

OTHER PUBLICATIONS

Kalvakunta et al, "Techniques for Remote Battery Management," U.S. Appl. No. 18/808,637, filed Aug. 19, 2024, 26 pages.
(Continued)

*Primary Examiner* — Xuxing Chen
(74) *Attorney, Agent, or Firm* — Kinney & Lange, P.A.

(57) ABSTRACT

A method is provided, including: (a) providing an initial charging current to a battery; (b) receiving state information about the battery, including: (1) a temperature, (2) a load profile, and (3) a power loss temporal profile including power loss durations and timings of power failure events; (c) determining, based on the state information, a modification, including: (1) in response to detecting that (i) the temperature exceeds a first upper threshold or (ii) the load profile exceeds a second upper threshold, setting the modification to be a decrease in the charging current; and (2) in response to (iii) detecting that the load profile is below a lower threshold or (iv) predicting that the battery won't reach a full charge by a next expected power failure event if the initial charging current is maintained, setting the modification to be an increase in the charging current; and (d) in response to determining the modification, adjusting the charging current provided to the battery based on the determined modification.

25 Claims, 3 Drawing Sheets

(51) Int. Cl.

| | |
|---|---|
| *H01M 10/44* | (2006.01) |
| *H01M 10/613* | (2014.01) |
| *H01M 10/615* | (2014.01) |
| *H01M 10/633* | (2014.01) |
| *H02J 7/40* | (2026.01) |
| *H02J 7/90* | (2026.01) |
| *H02J 9/06* | (2006.01) |
| *H02J 13/13* | (2026.01) |

(52) U.S. Cl.
CPC ....... *H01M 10/615* (2015.04); *H01M 10/633* (2015.04); *H02J 7/40* (2026.01); *H02J 7/933* (2026.01); *H02J 7/977* (2026.01); *H02J 13/13* (2026.01)

(56) References Cited

U.S. PATENT DOCUMENTS

| | | | | |
|---|---|---|---|---|
| 10,666,081 | B2 | 5/2020 | Irish et al. | |
| 2021/0083486 | A1* | 3/2021 | Klicpera | H02J 7/84 |
| 2022/0247190 | A1* | 8/2022 | Kang | H02J 7/50 |
| 2023/0055981 | A1* | 2/2023 | Syouda | G06F 1/3212 |

OTHER PUBLICATIONS

Extended European Search Report for European Patent Application No. 25198139.5, dated Nov. 27, 2025, twelve pages.

* cited by examiner

Figure 1:
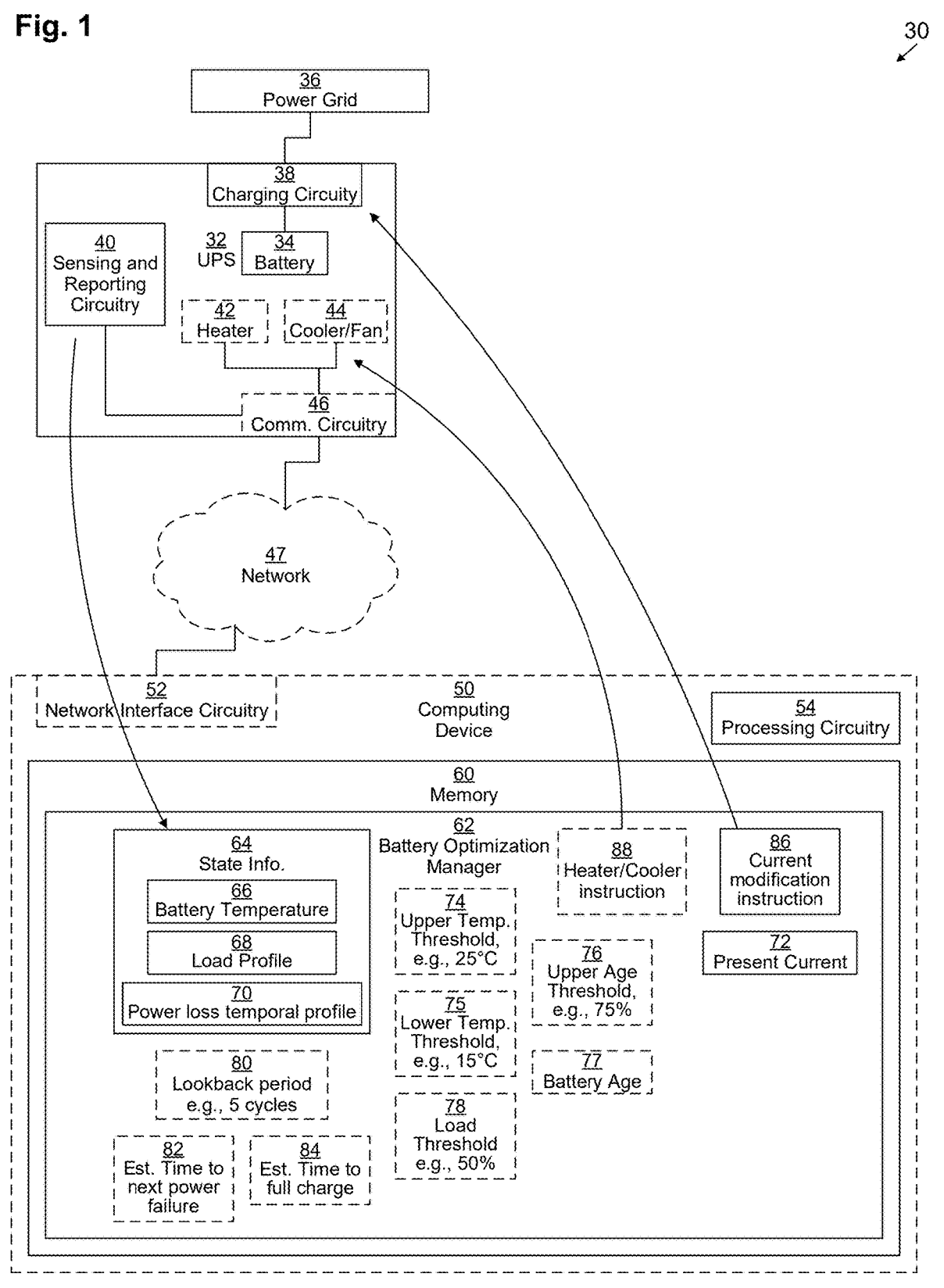

36
Power Grid

38
Charging Circuity

40
Sensing and
Reporting
Circuitry

32
UPS

34
Battery

42
Heater

44
Cooler/Fan

46
Comm. Circuitry

47
Network

52
Network Interface Circuitry

50
Computing
Device

54
Processing Circuitry

60
Memory

64
State Info.

66
Battery Temperature

68
Load Profile

70
Power loss temporal profile

62
Battery Optimization
Manager

74
Upper Temp.
Threshold,
e.g., 25°C

75
Lower Temp.
Threshold,
e.g., 15°C

78
Load
Threshold
e.g., 50%

88
Heater/Cooler
instruction

76
Upper Age
Threshold,
e.g., 75%

77
Battery Age

86
Current
modification
instruction

72
Present Current

80
Lookback period
e.g., 5 cycles

82
Est. Time to
next power
failure

84
Est. Time to
full charge

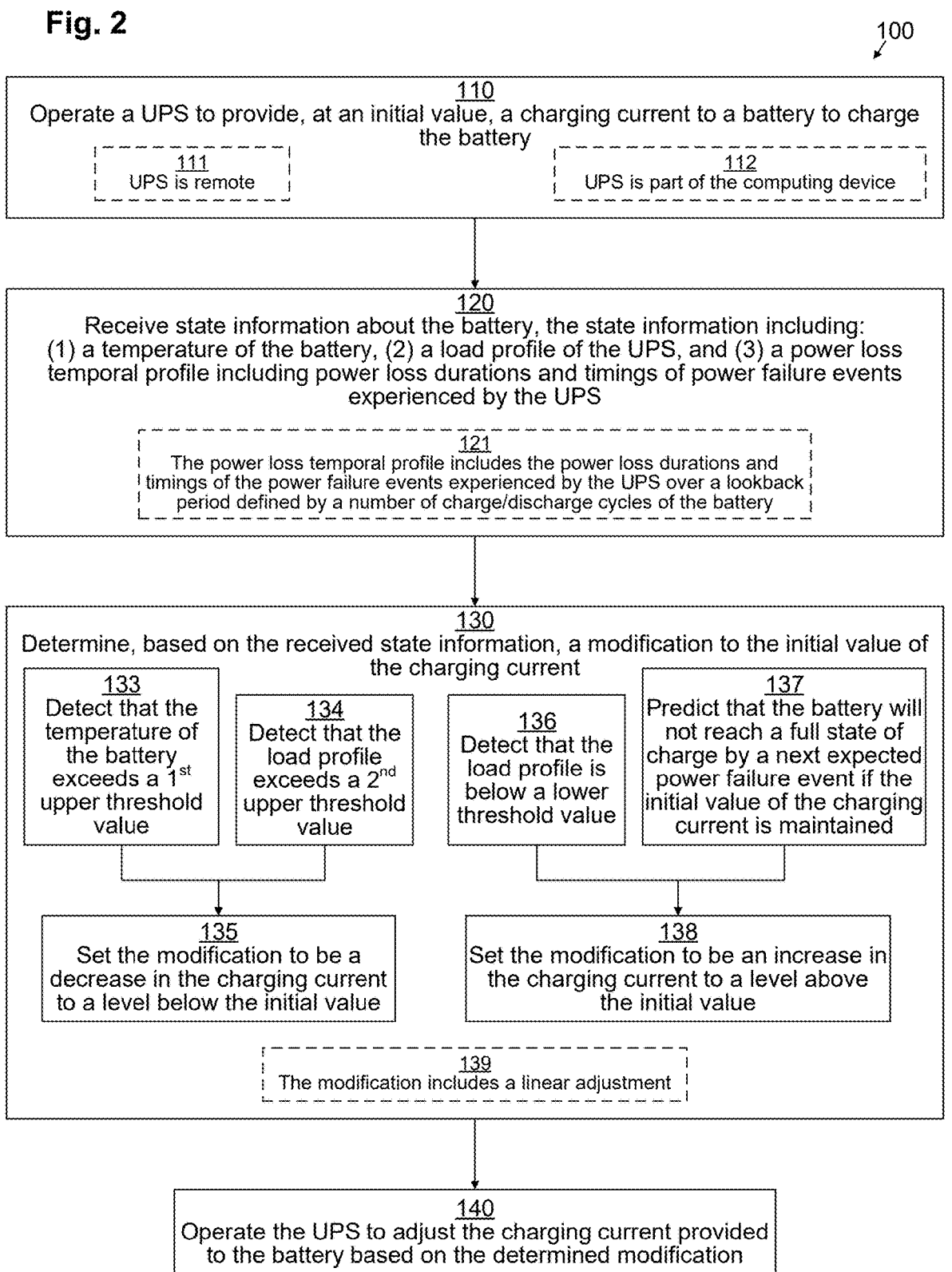

110
Operate a UPS to provide, at an initial value, a charging current to a battery to charge the battery > 111
> UPS is remote > 112
> UPS is part of the computing device

120
Receive state information about the battery, the state information including: (1) a temperature of the battery, (2) a load profile of the UPS, and (3) a power loss temporal profile including power loss durations and timings of power failure events experienced by the UPS > 121
> The power loss temporal profile includes the power loss durations and timings of the power failure events experienced by the UPS over a lookback period defined by a number of charge/discharge cycles of the battery

130
Determine, based on the received state information, a modification to the initial value of the charging current > 133
> Detect that the temperature of the battery exceeds a 1st upper threshold value > 134
> Detect that the load profile exceeds a 2nd upper threshold value > 136
> Detect that the load profile is below a lower threshold value > 137
> Predict that the battery will not reach a full state of charge by a next expected power failure event if the initial value of the charging current is maintained > 135
> Set the modification to be a decrease in the charging current to a level below the initial value > 138
> Set the modification to be an increase in the charging current to a level above the initial value > 139
> The modification includes a linear adjustment

140
Operate the UPS to adjust the charging current provided to the battery based on the determined modification

200

TECHNIQUES FOR MANAGING CHARGING OF BATTERIES

BACKGROUND

Uninterruptible Power Supply (UPS) units provide a backup source of power to electrical equipment in the event of a power failure. UPS units typically utilize one or more batteries to provide the backup power. Although various types of batteries may be used, in recent years, use of lithium-ion (Li-Ion) batteries has become more popular due to their high energy density and long lifespan.

SUMMARY

A computer program product is provided according to some embodiments. The computer program product includes a non-transitory computer-readable storage medium storing instructions, which, when performed by processing circuitry of a computing device, cause the computing device to: (a) operate a UPS to provide, at an initial value, a charging current to a battery to charge the battery; (b) receive state information about the battery, the state information including: (1) a temperature of the battery, (2) a load profile of the UPS, and (3) a power loss temporal profile including power loss durations and timings of power failure events experienced by the UPS; (c) determine, based on the received state information, a modification to the initial value of the charging current, wherein determining the modification includes: (1) in response to (i) detecting that the temperature of the battery exceeds a first upper threshold value or (ii) detecting that the load profile exceeds a second upper threshold value, setting the modification to be a decrease in the charging current to a level below the initial value; and (2) in response to (iii) detecting that the load profile is below a lower threshold value or (iv) predicting that the battery will not reach a full state of charge by a next expected power failure event if the initial value of the charging current is maintained, setting the modification to be an increase in the charging current to a level above the initial value; and (d) in response to determining the modification, operate the UPS to adjust the charging current provided to the battery based on the determined modification.

In some embodiments, predicting that the battery will not reach a full state of charge by a next expected power failure event if the initial value of the charging current is maintained includes: (I) predicting a next expected power failure event based on the power loss temporal profile; and (II) determining, based on the load profile, that the battery will not reach the full state of charge by the next expected power failure event provided that the initial value of the charging current is maintained.

In some of these embodiments, the power loss temporal profile includes the power loss durations and timings of the power failure events experienced by the UPS over a lookback period defined by a number of charge/discharge cycles of the battery. In some of these embodiments, predicting the next expected power failure event based on the power loss temporal profile includes determining a minimum time between successive power failure events experienced by the UPS over the lookback period. In other of these embodiments, predicting the next expected power failure event based on the power loss temporal profile includes determining an average and standard deviation time between successive power failure events experienced by the UPS over the lookback period. In some embodiments, the computing device is remote from the UPS; and the instructions, when performed by the processing circuitry of the computing device, further cause the computing device to receive and store the power loss durations and timings of the power failure events experienced by the UPS over the lookback period.

In an embodiment, the UPS includes the computing device therein.

In an embodiment, determining the modification to the initial value of the charging current includes making a linear adjustment.

In an embodiment, the instructions, when performed by the processing circuitry of the computing device, further cause the computing device to, while the UPS is in a power failure state and in response to the temperature of the battery exceeding the upper threshold value, cause the UPS to deactivate a heating device or to activate a cooling device.

In an embodiment, the instructions, when performed by the processing circuitry of the computing device, further cause the computing device to, while the UPS is in a power failure state and in response to an age of the battery exceeding an upper threshold age and a lower threshold temperature value exceeding the temperature of the battery, cause the UPS to activate a heating device or to deactivate a cooling device.

A method of optimizing performance of a battery of a UPS is provided according to some embodiments. The method includes (a) providing a charging current to charge the battery at an initial value; (b) receiving state information about the battery, the state information including: (1) a temperature of the battery, (2) a load profile of the UPS, and (3) a power loss temporal profile including power loss durations and timings of power failure events experienced by the UPS; (c) determining, based on the received state information, a modification to the initial value of the charging current, wherein determining the modification includes: (1) in response to (i) detecting that the temperature of the battery exceeds a first upper threshold value or (ii) detecting that the load profile exceeds a second upper threshold value, setting the modification to be a decrease in the charging current to a level below the initial value; and (2) in response to (iii) detecting that the load profile is below a lower threshold value or (iv) predicting that the battery will not reach a full state of charge by a next expected power failure event if the initial value of the charging current is maintained, setting the modification to be an increase in the charging current to a level above the initial value; and (d) in response to determining the modification, adjusting the charging current provided to the battery based on the determined modification.

In an embodiment, the temperature of the battery exceeds the first upper threshold value.

In an embodiment, the load profile exceeds the second upper threshold value.

In an embodiment, the load profile is below the lower threshold value.

In some embodiments, predicting that the battery will not reach a full state of charge by a next expected power failure event if the initial value of the charging current is maintained includes: (I) predicting the next expected power failure event based on the power loss temporal profile; and (II) determining, based on the load profile, that the battery will not reach the full state of charge by the next expected power failure event provided that the initial current is maintained.

In some of these embodiments, the power loss temporal profile includes the power loss durations and timings of the power failure events experienced by the UPS over a lookback period defined by a number of charge/discharge cycles of the battery. In some of these embodiments, predicting the next expected power failure event based on the power loss temporal profile includes determining a minimum time between successive power failure events experienced by the UPS over the lookback period. In other of these embodiments, predicting the next expected power failure event based on the power loss temporal profile includes determining an average and standard deviation time between successive power failure events experienced by the UPS over the lookback period. In some embodiments, the method is performed by a server remote from the UPS; and the method further includes the server receiving and storing the power loss durations and timings of the power failure events experienced by the UPS over the lookback period.

In an embodiment, the method is performed by the UPS.

In an embodiment, determining the modification to the initial current includes making a linear adjustment.

In an embodiment, the method further includes, while the UPS is in a power failure state and in response to the temperature of the battery exceeding an upper threshold value, deactivating a heating device or activating a cooling device.

In an embodiment, the method further includes, while the UPS is in a power failure state and in response to an age of the battery exceeding an upper threshold age and a lower threshold temperature value exceeding the temperature of the battery, activating a heating device or deactivating a cooling device.

A system is provided according to some embodiments. The system includes (I) a UPS; (II) processing circuitry coupled to memory configured to: (a) operate the UPS to provide, at an initial value, a charging current to a battery to charge the battery; (b) receive state information about the battery, the state information including: (1) a temperature of the battery, (2) a load profile of the UPS, and (3) a power loss temporal profile including power loss durations and timings of power failure events experienced by the UPS; (c) determine, based on the received state information, a modification to the initial value of the charging current, wherein determining the modification includes: (1) in response to (i) detecting that the temperature of the battery exceeds a first upper threshold value or (ii) detecting that the load profile exceeds a second upper threshold value, setting the modification to be a decrease in the charging current to a level below the initial value; and (2) in response to (iii) detecting that the load profile is below a lower threshold value or (iv) predicting that the battery will not reach a full state of charge by a next expected power failure event if the initial value of the charging current is maintained, setting the modification to be an increase in the charging current to a level above the initial value; and (d) in response to determining the modification, operate the UPS to adjust the charging current provided to the battery based on the determined modification.

In some embodiments, predicting that the battery will not reach a full state of charge by a next expected power failure event if the initial value of the charging current is maintained includes: (I) predicting a next expected power failure event based on the power loss temporal profile; and (II) determining, based on the load profile, that the battery will not reach the full state of charge by the next expected power failure event provided that the initial value of the charging current is maintained.

In some of these embodiments, the power loss temporal profile includes the power loss durations and timings of the power failure events experienced by the UPS over a lookback period defined by a number of charge/discharge cycles of the battery. In some of these embodiments, predicting the next expected power failure event based on the power loss temporal profile includes determining a minimum time between successive power failure events experienced by the UPS over the lookback period. In other of these embodiments, predicting the next expected power failure event based on the power loss temporal profile includes determining an average and standard deviation time between successive power failure events experienced by the UPS over the lookback period. In some embodiments, the processing circuitry and memory are installed within a server device remote from the UPS; the system further includes a data network; the server device includes first network interface circuitry connected to the data network; the UPS includes second network interface circuitry connected to the data network, the UPS being configured to communicate with the processing circuitry and memory via the data network; and the first network interface circuitry is configured to receive and store the power loss durations and timings of the power failure events experienced by the UPS over the lookback period.

In an embodiment, the processing circuitry and memory are installed within the UPS.

In an embodiment, determining the modification to the initial value of the charging current includes making a linear adjustment.

In an embodiment, the processing circuitry coupled to memory is further configured to, while the UPS is in a power failure state and in response to the temperature of the battery exceeding the upper threshold value, operate the UPS to deactivate a heating device or to activate a cooling device.

In an embodiment, the processing circuitry coupled to memory is further configured to, while the UPS is in a power failure state and in response to an age of the battery exceeding an upper threshold age and a lower threshold temperature value exceeding the temperature of the battery, operate the UPS to activate a heating device or to deactivate a cooling device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 1 illustrates an example system, apparatus, signals, and computer program product for use in connection with one or more embodiments.

FIG. 2 illustrates an example method in accordance with one or more embodiments.

FIG. 4 illustrates another example usage scenario in accordance with one or more embodiments.

DETAILED DESCRIPTION

Figure 3:
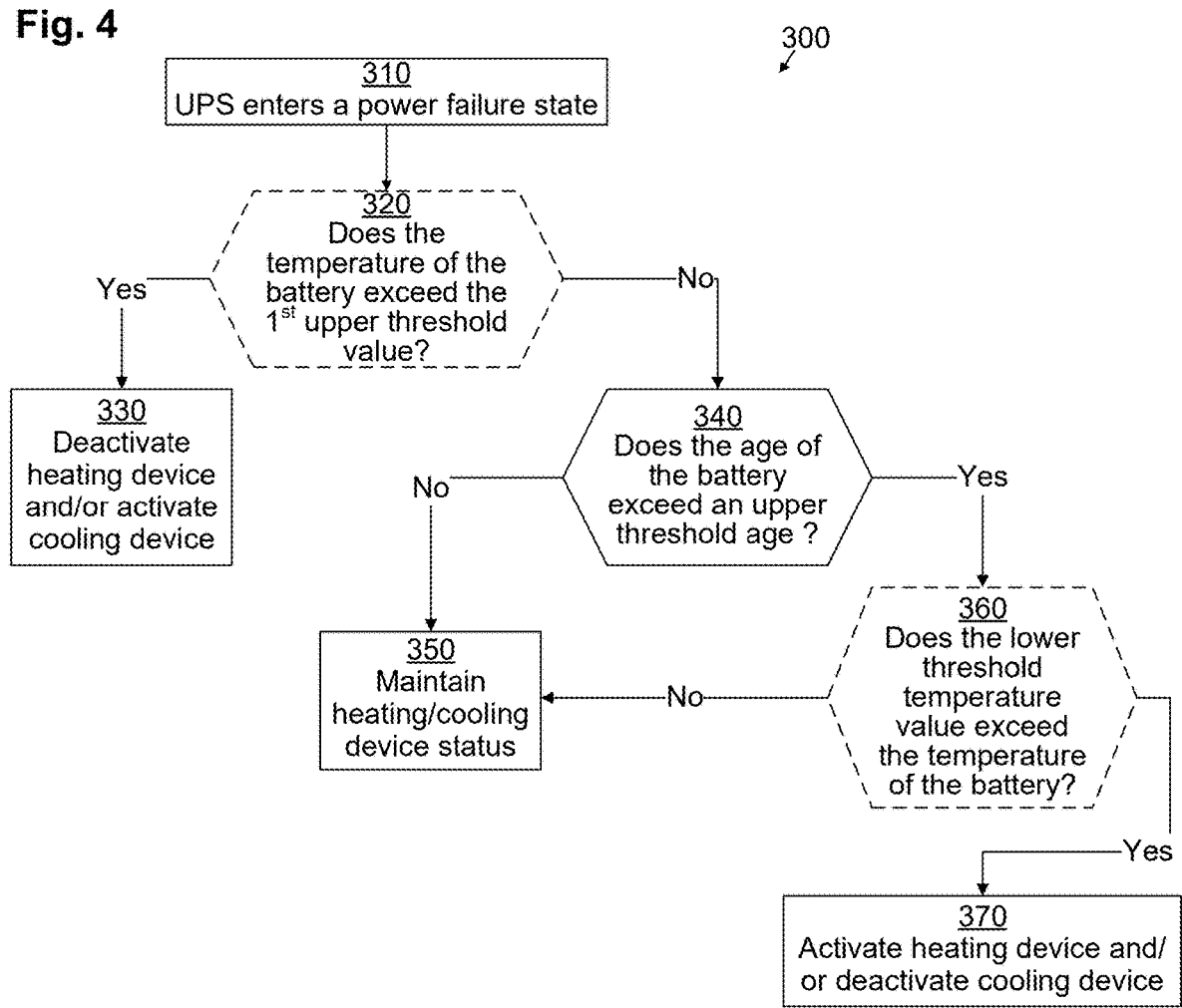
FIG. 3 illustrates an example usage scenario in accordance with one or more embodiments.

Unfortunately, lithium-ion (Li-Ion) batteries can suffer from various limitations that can impact their usage. For example, if Li-Ion batteries are overcharged, deeply discharged, or charged too quickly, the Li-Ion batteries may be damaged. As such, Li-Ion batteries are typically equipped with battery management systems (BMS) to protect against overcharging, deep discharge, and charging at too high of a voltage differential. A BMS may also communicate various parameters outside of the battery, such as the present state of charge (SoC), temperature, load profile, etc. Li-Ion batteries may also suffer capacity degradation that varies based on how they are charged. For example, charging a battery at too high a temperature or at too high of a load can lead to a reduction in capacity over the course of several months or years. In addition, charging a battery too slowly may lead to a situation where the battery is not fully charged when a power loss event occurs, leading to suboptimal performance of a UPS. In addition, while a battery is being discharged, the age of the battery and the temperature can affect the life of the battery.

Thus, it would be desirable to implement a system for a battery optimization manager to adjust the charging of a battery based on state information about the battery such as its temperature, load profile, and power loss temporal profile. In some embodiments, the age of the battery may also be used to adjust the operational state of its cooling and/or heating elements while discharging.

FIG. 1 depicts an example system 30 for use in connection with various embodiments described herein. System 30 includes a UPS 32 containing a battery 34 as well as a battery optimization manager 62 configured to receive state information 64 about the battery 34 and to issue a current modification instruction 86 in response to the state information 64 suggesting a change. System 30 also includes a power grid 36 that provides power to the UPS 32 that allows the battery 34 to be charged.

Battery 34 may be any kind of electronic battery, such as, for example, a lithium-ion (Li-Ion) battery or battery pack.

UPS 32 also includes charging circuitry 38 and sensing and reporting circuitry 40. In some embodiments, UPS 32 may also include a heating device 42 and/or a cooling device 44.

In some embodiments, as depicted, battery optimization manager 62 runs on a computing device 50 remote from the UPS 32. In these embodiments, UPS 32 includes communication circuitry 46, allowing it to communicate with the remote computing device 50 over a network 47. In other embodiments (not depicted), battery optimization manager 62 can run locally on the UPS 32, either as dedicated circuitry or as computer code stored within memory that executes on processing circuitry (not depicted).

Network 47 may be any kind of communications network, such as, for example, a LAN, WAN, SAN, the Internet, a wireless communication network, a virtual network, a fabric of interconnected switches, etc. Communication circuitry 46 may be any kind of circuitry configured to connect UPS 32 to network 47, such as a network interface card, for example.

Charging circuitry 38 obtains power from power grid 36 and uses that power to provide a charging current to the battery 34. Charging circuitry 38 is configured to provide a voltage or current as directed by the battery optimization manager 62.

Heating device 42 may be any kind of device configured to provide heat to the battery 34 (and possibly also to the remainder of the UPS 32), such as a resistive heater. Cooling device 44 may be any kind of device configured to remove heat from the battery 34 (and possibly also to the remainder of the UPS 32), such as a fan, liquid cooler, coolant pump, Peltier cooler, compressor, some combination thereof, etc.

Sensing and reporting circuitry 40 may be any kind of circuitry configured to sense and report state information 64 to the battery optimization manager 62. Sensing and reporting circuitry 40 includes at least some analog circuits or analog-to-digital converters coupled to analog sensing devices, such as to measure the temperature 66 of the battery 34. Sensing and reporting circuitry 40 also includes logic for measuring and calculating the load profile 68 of the UPS 32 and/or battery 34 and the power loss temporal profile 70 of the UPS 32 (e.g., a measure of when power failure events have occurred). In some embodiments, this logic may be implemented in software running on processing circuitry (not depicted), while in other embodiments, this logic may be implemented as a set of dedicated circuits (not depicted).

Computing device 50 may be any kind of computing device, such as, for example, a personal computer, laptop, workstation, server, enterprise server, tablet, smartphone, etc. Computing device 50 includes processing circuitry 54, network interface circuitry 52, and memory 60. Computing device 50 may also include various additional features as is well-known in the art, such as, for example, interconnection buses, etc.

Processing circuitry 54 may include any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 52 may include one or more Ethernet cards, cellular modems, Fibre Channel (FC) adapters, InfiniBand adapters, wireless networking adapters (e.g., Wi-Fi), and/or other devices for connecting to a network 47, such as, for example, a LAN, WAN, SAN, the Internet, a wireless communication network, a virtual network, a fabric of interconnected switches, etc.

Memory 60 may include any kind of digital system memory, such as, for example, random access memory (RAM), read-only memory (ROM), one-time programmable (OTP) memory, and/or flash memory. Memory 60 stores an operating system (OS, not depicted, e.g., a Linux, UNIX, Windows, MacOS, or similar operating system), battery optimization manager 62, and various drivers and other applications and software modules configured to execute on processing circuitry 54 as well as various data.

In operation, charging circuitry 38 of the UPS 32 initially provides a present current 72 (e.g., defined by a present voltage) to the battery 34 from the power grid 36. Then, sensing and reporting circuitry 40 measures and sends state information 64 (e.g., including at least the present temperature 66 of the battery 34, the load profile 68, and the power loss temporal profile 70) to battery optimization manager 62 (e.g., across network 47 via communication circuitry 46 of the UPS 32 and network interface circuitry 52 of the remote computing device 50). Battery optimization manager 62 then uses the state information to determine a current modification instruction 86 to send to the charging circuitry 38 (e.g., across network 47 via network interface circuitry 52 of the remote computing device 50 and communication circuitry 46 of the UPS 32) to cause a modified (e.g., higher or lower) current (e.g., defined by a modified voltage) to be provided to the battery 34 by the charging circuitry 38 from the power grid 36.

In some embodiments, battery optimization manager 62 compares the battery temperature 66 to an upper temperature threshold 74 (e.g., 25° C.); if the battery temperature 66 exceeds the upper temperature threshold 74, then battery optimization manager 62 causes the current modification instruction 86 to be an instruction to decrease the current (or, equivalently, the voltage) provided by the charging circuitry 38 to the battery 34. In some embodiments, the current modification instruction 86 is a linear adjustment according to a set formula, so that there is a linear relationship between the difference between the battery temperature 66 and the upper temperature threshold 74 and the amount of reduction caused by the current modification instruction 86.

In some embodiments, battery optimization manager 62 compares the load profile 68 to a load threshold 78 (e.g., 50% of the maximum load allowed on the battery 34); if the load profile 68 exceeds the load threshold 78, then battery optimization manager 62 causes the current modification instruction 86 to be an instruction to decrease the current (or, equivalently, the voltage) provided by the charging circuitry 38 to the battery 34. In some embodiments, the current modification instruction 86 is a linear adjustment according to a set formula, so that there is a linear relationship between the difference between the load profile 68 and the load threshold 78 and the amount of reduction caused by the current modification instruction 86. It should be understood that the load profile 68 represents the total load on the battery 34, including both charging load and discharging load.

In some embodiments, if the load threshold 78 exceeds the load profile 68, then battery optimization manager 62 causes the current modification instruction 86 to be an instruction to increase the current (or, equivalently, the voltage) provided by the charging circuitry 38 to the battery 34. In some embodiments, the current modification instruction 86 is a linear adjustment according to a set formula, so that there is a linear relationship between the difference between the load threshold 78 and the load profile 68 and the amount of increase caused by the current modification instruction 86.

In some embodiments, battery optimization manager 62 predicts, with reference to the power loss temporal profile 70, whether or not the battery 34 will reach a full state of charge by a next expected power failure event (e.g., a blackout, blown fuse, etc.); if the battery 34 is not expected to reach a full state of charge by the next expected power failure event, then battery optimization manager 62 causes the current modification instruction 86 to be an instruction to increase the current (or, equivalently, the voltage) provided by the charging circuitry 38 to the battery 34. In some embodiments, the current modification instruction 86 is a linear adjustment according to a set formula, so that there is a linear relationship between how long after the next expected power failure event the battery 34 is expected to reach the full state of charge and the amount of increase caused by the current modification instruction 86.

In some embodiments, the power loss temporal profile 70 includes both power loss durations and power loss timings of power failure events over a lookback period 80 (e.g., 5 or 10 full charge-discharge cycles of the battery 34). This information may be provided by the sensing and reporting circuitry 40 in real-time and saved by the battery optimization manager 62 as far back as the length of the lookback period 80. In some embodiments, battery optimization manager 62 estimates the time 84 until the battery 34 is expected to reach a full state of charge by comparing the present state of charge of the battery 34 to the full state of charge and estimating a net charging speed (which can vary over time) based on the charging load and discharging load of the battery 34, as the charging load and discharging load of the battery 34 are expected to vary over time. In some embodiments, battery optimization manager 62 estimates the time 82 until the next power failure event by determining a minimum amount of time between the end of a power failure event and the beginning of the next power failure event over the lookback period 80 and subtracting the elapsed time since the end of the last power failure event. In other embodiments, battery optimization manager 62 estimates the time 82 until the next power failure event by determining an average amount of time between the end of a power failure event and the beginning of the next power failure event over the lookback period 80 and subtracting the elapsed time since the end of the last power failure event. In some of these embodiments, battery optimization manager 62 refines the time 82 until the next power failure event by determining a standard deviation of the times between power failure events, and subtracting one or two times the standard deviation from the average amount of time prior to subtracting the elapsed time since the end of the last power failure event.

In some embodiments, various conflicting modifications are harmonized prior to sending out the current modification instruction 86.

In some embodiments, during the course of a power failure event, while the battery 34 is providing power to the UPS 32, battery optimization manager 62 sends a heater/cooler instruction 88 to the UPS 32 based, at least in part, on the state information 64. For example, if the battery temperature 66 exceeds the upper temperature threshold 74, then battery optimization manager 62 causes the heater/cooler instruction 88 to be an instruction to activate (or increase the cooling power of) the cooling device 44 and/or to deactivate (or decrease the heating power of) the heating device 42. Conversely, if a lower temperature threshold 75 (e.g., 15° C.) exceeds the battery temperature 66, then battery optimization manager 62 causes the heater/cooler instruction 88 to be an instruction to deactivate (or decrease the cooling power of) the cooling device 44 and/or to activate (or increase the heating power of) the heating device 42. In some embodiments, battery optimization manager 62 only performs a comparison between the battery temperature 66 and the lower temperature threshold 75 if the present age 77 of the battery 34 exceeds an upper age threshold (e.g., 75% of the rated life of the battery 34).

FIG. 2 illustrates an example method 100 performed by a system 30 for optimizing performance of a battery 34 of a UPS 32. It should be understood that any time a piece of software (e.g., battery optimization manager 62) is described as performing a method, process, step, or function, what is meant is that a computing device (e.g., computing device 50, UPS 32) on which that piece of software is running performs the method, process, step, or function when executing that piece of software on its processing circuitry 54. It should be understood, that one or more of the steps or sub-steps of method 100 may be omitted in some embodiments. Similarly, in some embodiments, one or more steps or sub-steps may be combined or performed in a different order. Dashed lines indicate that a step or sub-step is either optional or representative of alternate embodiments or use cases.

In step 110, battery optimization manager 62 operates the UPS 32 to provide, at an initial value, a charging current 72 to a battery 34 (e.g., a battery 34 installed within UPS 32) to charge the battery 34. In some embodiments (sub-step 111), the UPS 32 is remote from the battery optimization manager 62. In other embodiments (sub-step 112), the battery optimization manager 62 runs on the UPS 32 itself.

In step 120, battery optimization manager 62 receives state information 64 about the battery 34, the state information 64 including: (1) a temperature 66 of the battery 34, (2) a load profile 68 of the UPS 32, and (3) a power loss temporal profile 70 including power loss durations and timings of power failure events experienced by the UPS 32.

In some embodiments (sub-step 121), the power loss durations and timings of power failure events experienced by the UPS 32 are received and recorded in memory 60 by the battery optimization manager 62 over the course of lookback period 80.

In step 130, battery optimization manager 62 determines, based on the received state information 64, a modification to the initial value of the charging current 72. Depending on the use case, step 130 includes one or more of sub-steps 133, 134, 136, 137 and one or more of sub-steps 135, 138.

In sub-step 133, battery optimization manager 62 detects that the battery temperature 66 exceeds the upper temperature threshold 74. In response, in sub-step 135, battery optimization manager 62 sets the current modification instruction 86 to be an instruction to decrease the current (or, equivalently, the voltage) provided by the charging circuitry 38 to the battery 34.

In sub-step 134, battery optimization manager 62 detects that the load profile 68 exceeds the load threshold 78. In response, in sub-step 135, battery optimization manager 62 sets the current modification instruction 86 to be an instruction to decrease the current (or, equivalently, the voltage) provided by the charging circuitry 38 to the battery 34.

In sub-step 136, battery optimization manager 62 detects that the load profile 68 is below a lower load threshold. In response, in sub-step 138, battery optimization manager 62 sets the current modification instruction 86 to be an instruction to increase the current (or, equivalently, the voltage) provided by the charging circuitry 38 to the battery 34.

In sub-step 137, battery optimization manager 62 predicts that the battery 34 will not reach a full state of charge by a next expected power failure event if the initial value of the charging current 72 is maintained. In response, in sub-step 138, battery optimization manager 62 sets the current modification instruction 86 to be an instruction to increase the current (or, equivalently, the voltage) provided by the charging circuitry 38 to the battery 34.

It should be understood that more than one of sub-steps 133, 134, 136, 137 may occur simultaneously. In such an event, sub-steps 135, 137 may be combined to set a net increase or decrease to the charging current 72. In one example embodiment, sub-step 137 has the highest priority followed by sub-steps 134, 136; thus an increase due to sub-step 137 overrides the other factors, while a modification due to either sub-step 134 or 136 overrides a decrease due to sub-step 133.

In some embodiments, step 130 includes sub-step 139. In sub-step 139, battery optimization manager 62 sets the increase or decrease of the current modification instruction 86 to be a linear adjustment.

In step 140, battery optimization manager 62 operates the UPS 32 to adjust the charging current 72 (and thereby also the voltage) provided to the battery 34 based on the modification determined in step 130 (e.g., by sending the current modification instruction 86 to the UPS 32).

FIG. 3 illustrates an example method 200 performed by battery optimization manager 62 for implementing sub-step 137.

In step 210, battery optimization manager 62 predicts a next expected power failure event based on the power loss temporal profile 70. In some embodiments, step 210 includes sub-step 212. In sub-step 212, battery optimization manager 62 determines the minimum time between successive power failure events experienced by the UPS 32 over the lookback period 80 and uses that value to estimate the time time 82 remaining until the next expected power failure event (by subtracting the elapsed time since the last power failure event).

In other embodiments, step 210 includes sub-step 214. In sub-step 214, battery optimization manager 62 determines an average (and standard deviation) time between successive power failure events experienced by the UPS 32 over the lookback period 80 and uses that value to estimate the time 82 remaining until the next expected power failure event (by subtracting the elapsed time since the last power failure event). Either the average time may be used by itself or the average time may be modified by subtracting one or two times the standard deviation.

In step 210, battery optimization manager 62 determines, based on the load profile, the current state of charge of the battery 34, and the time 82 remaining until the next expected power failure event, whether the battery 34 will reach its full state of charge by the next expected power failure event provided that the present value of the charging current 72 is maintained.

FIG. 4 illustrates an example method 300 performed by battery optimization manager 62 for preserving the life of a battery 34 in system 30, while the UPS 32 is in a power failure state.

In step 310, the UPS 32 enters a power failure state or backup mode, so it begins to draw power from the battery 34.

In step 320, battery optimization manager 62 determines whether or not the temperature 66 of the battery 34 exceeds the upper temperature threshold 74. If so, operation proceeds with step 330, in which battery optimization manager 62 causes the heating device 42 to be deactivated (or turned down) and/or the cooling device 44 to be activated (or turned up), e.g., by issuing a heater/cooler instruction 88 to that effect to the UPS 32. Otherwise, operation proceeds with step 340.

In step 340, battery optimization manager 62 determines whether or not the age 77 of the battery 34 exceeds the upper age threshold 76. If not, operation proceeds with step 350, in which the status of the heating device 42 and/or cooling device 44 are maintained at their present levels. Otherwise, operation proceeds with step 360.

In step 360, battery optimization manager 62 determines whether or not the lower temperature threshold 75 exceeds the temperature 66 of the battery 34. If so, operation proceeds with step 370, in which battery optimization manager 62 causes the heating device 42 to be activated (or turned up) and/or the cooling device 44 to be deactivated (or turned down), e.g., by issuing a heater/cooler instruction 88 to that effect to the UPS 32. Otherwise, operation proceeds with step 350, in which the status of the heating device 42 and/or cooling device 44 are maintained at their present levels.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "background" or as "conventional," Applicants make no admission that such technique, method, apparatus, or other concept is actually prior art under 35 U.S. C. § 102 or 103, such determination being a legal determination that depends upon many factors, not all of which are known to Applicants at this time.

What is claimed is:

1. A computer program product comprising a non-transitory computer-readable storage medium storing instructions, which, when performed by processing circuitry of a computing device, cause the computing device to:

operate an uninterruptable power supply (UPS) to provide, at an initial value, a charging current to a battery to charge the battery;

receive state information about the battery, the state information including:

a temperature of the battery, a load profile of the UPS, and a power loss temporal profile including power loss durations and timings of power failure events experienced by the UPS;

determine, based on the received state information, a modification to the initial value of the charging current, wherein determining the modification includes:

in response to (i) detecting that the temperature of the battery exceeds a first upper threshold value or (ii) detecting that the load profile exceeds a second upper threshold value, setting the modification to be a decrease in the charging current to a level below the initial value; and in response to (iii) detecting that the load profile is below a lower threshold value or (iv) predicting that the battery will not reach a full state of charge by a next expected power failure event if the initial value of the charging current is maintained, setting the modification to be an increase in the charging current to a level above the initial value; and in response to determining the modification, operate the UPS to adjust the charging current provided to the battery based on the determined modification.

2. The computer program product of claim 1 wherein predicting that the battery will not reach a full state of charge by a next expected power failure event if the initial value of the charging current is maintained includes:

predicting a next expected power failure event based on the power loss temporal profile; and determining, based on the load profile, that the battery will not reach the full state of charge by the next expected power failure event provided that the initial value of the charging current is maintained.

3. The computer program product of claim 2 wherein the power loss temporal profile includes the power loss durations and timings of the power failure events experienced by the UPS over a lookback period defined by a number of charge/discharge cycles of the battery.

4. The computer program product of claim 3 wherein predicting the next expected power failure event based on the power loss temporal profile includes determining a minimum time between successive power failure events experienced by the UPS over the lookback period.

5. The computer program product of claim 3 wherein predicting the next expected power failure event based on the power loss temporal profile includes determining an average and standard deviation time between successive power failure events experienced by the UPS over the lookback period.

6. The computer program product of claim 3 wherein:

the computing device is remote from the UPS; and the instructions, when performed by the processing circuitry of the computing device, further cause the computing device to receive and store the power loss durations and timings of the power failure events experienced by the UPS over the lookback period.

7. The computer program product of claim 1 wherein the UPS includes the computing device therein.

8. The computer program product of claim 1 wherein determining the modification to the initial value of the charging current includes making a linear adjustment.

9. The computer program product of claim 1, wherein the instructions, when performed by the processing circuitry of the computing device, further cause the computing device to, while the UPS is in a power failure state and in response to the temperature of the battery exceeding the upper threshold value, cause the UPS to deactivate a heating device or to activate a cooling device.

10. The computer program product of claim 1, wherein the instructions, when performed by the processing circuitry of the computing device, further cause the computing device to, while the UPS is in a power failure state and in response to an age of the battery exceeding an upper threshold age and a lower threshold temperature value exceeding the temperature of the battery, cause the UPS to activate a heating device or to deactivate a cooling device.

11. A method of optimizing performance of a battery of an uninterruptable power supply (UPS), the method comprising:

providing a charging current to charge the battery at an initial value;

receiving state information about the battery, the state information including:

a temperature of the battery, a load profile of the UPS, and a power loss temporal profile including power loss durations and timings of power failure events experienced by the UPS;

determining, based on the received state information, a modification to the initial value of the charging current, wherein determining the modification includes:

in response to (i) detecting that the temperature of the battery exceeds a first upper threshold value or (ii) detecting that the load profile exceeds a second upper threshold value, setting the modification to be a decrease in the charging current to a level below the initial value; and in response to (iii) detecting that the load profile is below a lower threshold value or (iv) predicting that the battery will not reach a full state of charge by a next expected power failure event if the initial value of the charging current is maintained, setting the modification to be an increase in the charging current to a level above the initial value; and in response to determining the modification, adjusting the charging current provided to the battery based on the determined modification.

12. The method of claim 11 wherein the temperature of the battery exceeds the first upper threshold value.

13. The method of claim 11 wherein the load profile exceeds the second upper threshold value.

14. The method of claim 11 wherein the load profile is below the lower threshold value.

15. The method of claim 11 wherein predicting that the battery will not reach a full state of charge by a next expected power failure event if the initial value of the charging current is maintained includes:

predicting the next expected power failure event based on the power loss temporal profile; and determining, based on the load profile, that the battery will not reach the full state of charge by the next expected power failure event provided that the initial current is maintained.

16. A system comprising:

an uninterruptable power supply (UPS); and processing circuitry coupled to memory configured to:

operate the UPS to provide, at an initial value, a charging current to a battery to charge the battery;

receive state information about the battery, the state information including:

a temperature of the battery, a load profile of the UPS, and a power loss temporal profile including power loss durations and timings of power failure events experienced by the UPS;

determine, based on the received state information, a modification to the initial value of the charging current, wherein determining the modification includes:

in response to (i) detecting that the temperature of the battery exceeds a first upper threshold value or (ii) detecting that the load profile exceeds a second upper threshold value, setting the modification to be a decrease in the charging current to a level below the initial value; and in response to (iii) detecting that the load profile is below a lower threshold value or (iv) predicting that the battery will not reach a full state of charge by a next expected power failure event if the initial value of the charging current is maintained, setting the modification to be an increase in the charging current to a level above the initial value; and in response to determining the modification, operate the UPS to adjust the charging current provided to the battery based on the determined modification.

17. The system of claim 16 wherein predicting that the battery will not reach a full state of charge by a next expected power failure event if the initial value of the charging current is maintained includes:

predicting a next expected power failure event based on the power loss temporal profile; and determining, based on the load profile, that the battery will not reach the full state of charge by the next expected power failure event provided that the initial value of the charging current is maintained.

18. The system of claim 17 wherein the power loss temporal profile includes the power loss durations and timings of the power failure events experienced by the UPS over a lookback period defined by a number of charge/discharge cycles of the battery.

19. The system of claim 18 wherein predicting the next expected power failure event based on the power loss temporal profile includes determining a minimum time between successive power failure events experienced by the UPS over the lookback period.

20. The system of claim 18 wherein predicting the next expected power failure event based on the power loss temporal profile includes determining an average and standard deviation time between successive power failure events experienced by the UPS over the lookback period.

21. The system of claim 18 wherein:

the processing circuitry and memory are installed within a server device remote from the UPS;

the system further includes a data network;

the server device includes first network interface circuitry connected to the data network;

the UPS includes second network interface circuitry connected to the data network, the UPS being configured to communicate with the processing circuitry and memory via the data network; and the first network interface circuitry is configured to receive and store the power loss durations and timings of the power failure events experienced by the UPS over the lookback period.

22. The system of claim 16 wherein the processing circuitry and memory are installed within the UPS.

23. The system of claim 16 wherein determining the modification to the initial value of the charging current includes making a linear adjustment.

24. The system of claim 16, wherein the processing circuitry coupled to memory is further configured to, while the UPS is in a power failure state and in response to the temperature of the battery exceeding the upper threshold value, operate the UPS to deactivate a heating device or to activate a cooling device.

25. The system of claim 16, wherein the processing circuitry coupled to memory is further configured to, while the UPS is in a power failure state and in response to an age of the battery exceeding an upper threshold age and a lower threshold temperature value exceeding the temperature of the battery, operate the UPS to activate a heating device or to deactivate a cooling device.

* * * * *